(12) United States Patent
Klitsgaard et al.

(10) Patent No.: US 6,624,752 B2
(45) Date of Patent: Sep. 23, 2003

(54) OBJECT DETECTION SYSTEM

(75) Inventors: Niels Christian Klitsgaard, Aalborg (DK); Carlos Østby, Oslo (NO); Peter Lund, Aalborg (DK); Bo Christiansen, HillerØd (DK)

(73) Assignee: Bluetags A/S, Aalborg (DK)

( * ) Notice: Subject to any disclaimer, the term of this patent is extended or adjusted under 35 U.S.C. 154(b) by 0 days.

(21) Appl. No.: 09/923,387

(22) Filed: Aug. 8, 2001

(65) Prior Publication Data

US 2002/0014955 A1 Feb. 7, 2002

Related U.S. Application Data

(63) Continuation of application No. PCT/DK00/00637, filed on Nov. 15, 2000.
(60) Provisional application No. 60/223,726, filed on Aug. 8, 2000.

(30) Foreign Application Priority Data

Nov. 15, 1999 (DK) .......................... 1999 01640
Oct. 19, 2000 (DK) .......................... 2000 01563
Aug. 23, 2000 (DK) .......................... 2000 01248
Aug. 8, 2000 (DK) .......................... 2000 01185

(51) Int. Cl.[7] .............................................. G08B 13/14
(52) U.S. Cl. ................... 340/572.1; 340/573.1; 340/573.4
(58) Field of Search ................ 340/572.1, 309.15, 340/573.1, 573.4, 825.36, 825.49, 539

(56) References Cited

U.S. PATENT DOCUMENTS

| | | | |
|---|---|---|---|
| 4,274,089 A | 6/1981 | Giles | |
| 4,476,469 A | 10/1984 | Lander | |
| 4,918,425 A | * 4/1990 | Greenberg et al. | 340/539 |
| 5,021,765 A | * 6/1991 | Morgan | 340/539 |
| 5,235,326 A | 8/1993 | Beigel et al. | |
| 5,357,361 A | 10/1994 | Nishizawa | |
| 5,444,448 A | 8/1995 | Schuermann et al. | |
| 5,629,678 A | 5/1997 | Gargano et al. | |
| 5,673,023 A | 9/1997 | Smith | |
| 5,680,105 A | 10/1997 | Hedrick | |

(List continued on next page.)

FOREIGN PATENT DOCUMENTS

| | | |
|---|---|---|
| EP | 0230173 B1 | 7/1987 |
| EP | 0494764 A1 | 7/1992 |
| FR | 2667183 | 3/1992 |
| FR | 2765969 | 1/1999 |
| FR | 2770319 | 4/1999 |
| GB | 1298381 | 11/1972 |
| GB | 2257873 A | 1/1993 |
| GB | 2277850 A | 11/1994 |
| GB | 2317729 A | 4/1998 |
| WO | WO 8602186 A1 | 4/1986 |
| WO | WO 9946742 A1 | 9/1999 |

OTHER PUBLICATIONS

"BlueCore 01 Single Chip Bluetooth System", By Cabridge Silicon Radio, 2000, pp. 1–19.
Bluetooth Review; Issue 38; Sep. 2001; vol. 2, Issue 40; Newsletter date: Oct. 8, 2001; pp. 1–4.
Helen Gross, "Last Call for the Baggage to Cairo", p. 22, Jan. 21, 1995.

*Primary Examiner*—John Tweel
(74) *Attorney, Agent, or Firm*—Birch, Stewart, Kolasch & Birch, LLP

(57) ABSTRACT

The present invention relates to a system and a method for detecting and identifying an object. More specifically the invention relates to a tag for attachment e.g. to luggage, the tag being adapted for transmission of an identifiable signal and a receiver for detecting and identifying the signal. The invention is concerned with use of the Internet and handheld terminals such as mobile phones in combination with Bluetooth™ or DECT technology for communicating information in relation to the object.

33 Claims, 8 Drawing Sheets

U.S. PATENT DOCUMENTS

Figure 1:
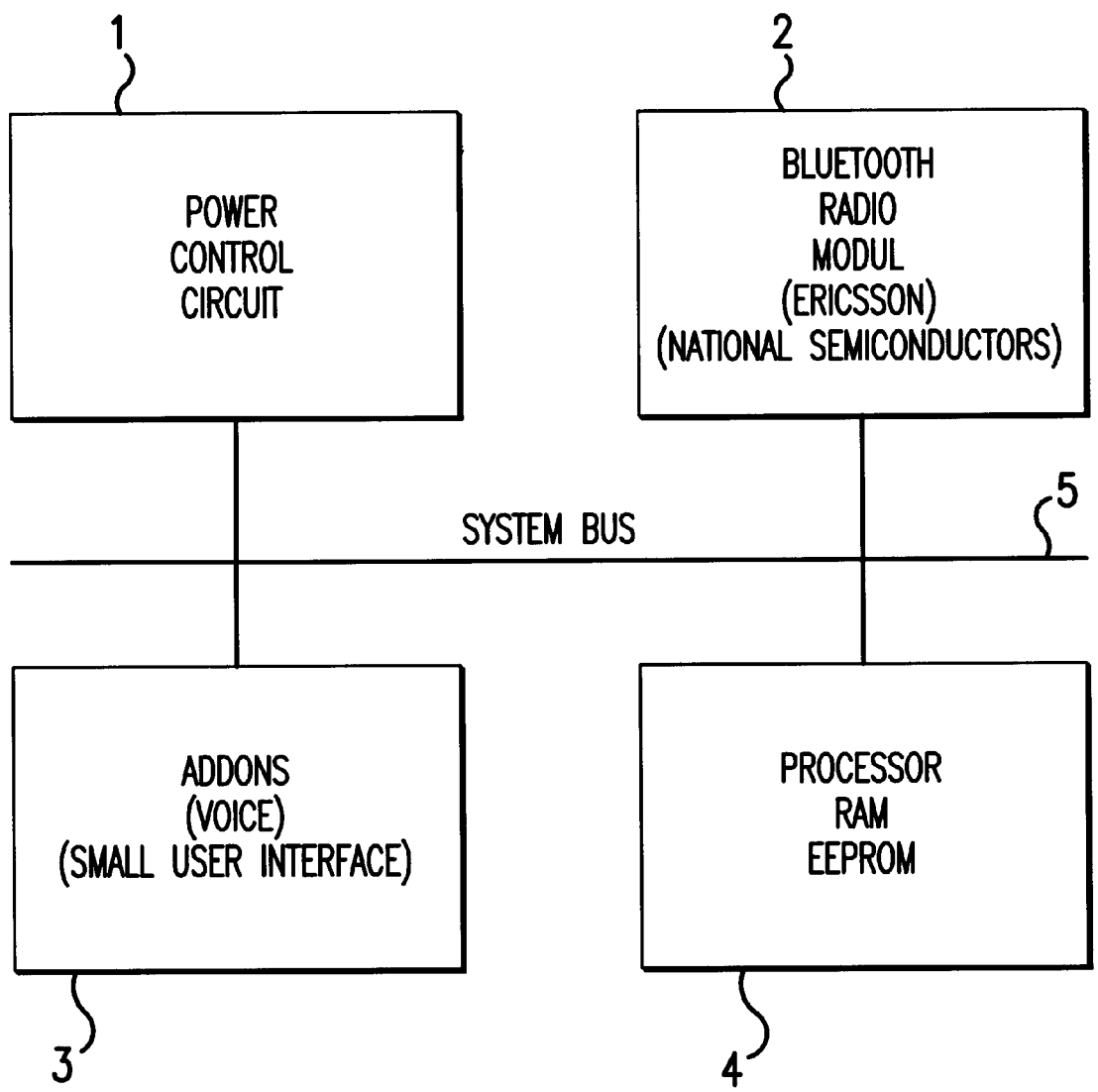

| | | | |
|---|---|---|---|
| 5,686,891 A | | 11/1997 | Sacca et al. |
| 5,959,533 A | * | 9/1999 | Layson, Jr. et al. ...... 340/573.1 |
| 6,084,517 A | * | 7/2000 | Rabanne et al. ......... 340/573.4 |
| 6,104,295 A | * | 8/2000 | Gaisser et al. ........... 340/573.4 |
| 6,150,921 A | * | 11/2000 | Werb et al. ................ 340/10.1 |
| 6,154,139 A | * | 11/2000 | Heller .................... 340/573.4 |
| 6,218,945 B1 | * | 4/2001 | Taylor, Jr. ................ 340/573.1 |
| 6,259,355 B1 | * | 7/2001 | Chaco et al. .......... 340/286.07 |
| 6,259,367 B1 | | 7/2001 | Klein |
| 6,275,707 B1 | * | 8/2001 | Reed et al. .................. 455/456 |
| 6,297,737 B1 | | 10/2001 | Irvin |
| 6,317,049 B1 | * | 11/2001 | Toubia et al. ............ 340/573.4 |

\* cited by examiner

OBJECT DETECTION SYSTEM

This application is a Continuation of PCT International Application No. PCT/DK00/00637 filed on Nov. 15, 2000, which was published in English and a non-provisional application of No. 60/223,726 filed Aug. 8, 2000 and which designated the United States and on which priority is claimed under 35 U.S.C. §120, the entire contents of which are hereby incorporated by reference.

FIELD OF THE INVENTION

The present invention relates to a system and a method for detecting and identifying an object. More specifically the invention relates to a tag for attachment e.g. to luggage, the tag being adapted for transmission of an identifiable signal and a receiver for detecting and identifying the signal.

The present invention is concerned with the use of Bluetooth™ technology for detection of the object.

DESCRIPTION OF THE PRIOR ART

In general, the detection and identification of objects relates to the problem of finding an object or to the problem of detecting the loss of an object. The object could be anything such as luggage, a car, a bicycle or even persons. The problem of finding the object could be the problem of finding a specific car in a car park or city, finding luggage on a luggage conveyer in an airport, finding a specific bike in a school yard or of finding a person such as a child in a school yard or in a shopping centre etc. The problem of detecting the loss of an object could be detecting whether the object is being stolen or whether the object has been forgotten.

Generally speaking, methods and devices for the identification and detection of objects exist. As an example, luggage is typically labeled with a hand written or a bar coded label indicating the identity of the owner of the luggage. However, the hand written label can be impossible to read either due to handwriting that is difficult to read or the label may be destroyed by humidity or by the transportation of the luggage. The hand written label does not by itself constitute a guarantee for the identity of the owner of the luggage, since it is easy to change the label or to write a label with a wrong name or address. Moreover the label does not alert the owner if the luggage is either forgotten or stolen. Air cargo and airport staff in general experience huge problems on luggage handling. As an example, it can be difficult to find owners of luggage that has been left or forgotten and it can be difficult to trace the place of sojourn of the traveler. A badly written luggage tag can cause that the luggage ends up in a wrong destination. For that reason, insurance companies as well as airline companies effect expenditures for compensation of lost luggage.

Similarly systems for identification of persons exist. As an example people are typically identified towards authorities e.g. in relation to inspection of tickets, for admittance control etc. In general the existing systems are related with the same mentioned drawbacks as the systems for luggage detection.

DESCRIPTION OF THE INVENTION

It is an object of the present invention to provide a tag that can be attached to objects such as luggage or persons and that reduces or eliminates the above mentioned problems.

According to the object, the present invention relates to a system for detecting objects, said system comprising:

at least one first transmitting unit to be located near the luggage, the first unit having an identity and being provided with a transmitter for transmitting a first signal representing the identity of the first transmitting unit, and a receiving unit provided with a receiver for receiving the first signal, the receiving unit being adapted to generate a second signal in case the first signal represents the identity of one of said at least one first transmitting unit(s), the receiving unit being adapted to receive the first signal when the distance between the first transmitting unit and the receiving unit is within a predetermined interval.

The objects may be luggage, e.g. to be handled through a number of destinations, e.g. through an airport. The objects may also be persons, e.g. children in a kinder garden or in a school, prisoners in a jailhouse. It could also be a car, or it may simply be a system for the identification of persons, e.g. to be used in connection with ticket inspection in a fun park or in a public transportation system or for verification of identity in connection with admittance control systems. As an example, the first transmitting unit may be used in connection with admittance control, e.g. in a skiing resort. The identification of the holder of the tag could be used for later payment.

In general the objects may be any people or item for whom or which a reliable detection and/or identification is requested. The transmitting unit could be integrated in a luggage tag of if the object is a human being such as a child the transmitting unit may be integrated in a bracelet, a wristwatch or in clothes. The transmitting unit could also be integrated in sports equipment, in a bicycle, in a car or even in tools so that stolen tools can be found. As an example, the transmitting unit may be integrated in the frame of the bike, so that the bike can be found amongst a number of bikes, e.g. in a schoolyard. As another example, the transmitting unit may be integrated e.g. in ski bindings, thus enabling the ski equipment to be found amongst the ski equipment left outside a restaurant of left in the ski-room in a hotel or so that the skier may be identified when using the lift system—the transmitting unit thus acting as a ski-pass. By means of yet another example the transmitting unit may be integrated in a wristband so that the presence of the person wearing the wristband easily can be detected or found. The transmitting unit could also be integrated in key-rings etc. thus enabling the retrieval of a lost key.

Preferably the first transmitting unit comprises an active transmitting unit, provided with power driven means for transmitting the first signal in the form of a radio signal. The transmitting unit may be provided with a power source, e.g. in the form of a battery or in the form of solar cells or kinetic cells capable of charging an electrical current upon shaking, vibrating or in any other way moving the transmitting unit.

The receiving unit may be integrated in phone devices, computers, cars etc. or the receiving unit may be installed in a residential property so as to detect and identify objects or persons, e.g. for the purpose of admittance control.

The first transmitting unit could be an electronic circuit capable of transmitting a signal that can identify the circuit and thus identify a bag or a person or item carrying the tag. As an example the circuit could be integrated in a tag to be fastened e.g. to luggage.

By means of the second signal generated by the receiver, the owner of the luggage can be notified e.g. when the luggage arrives to the luggage claim area in an airport. The predetermined distance indicates towards the owner, how far away the luggage is when the second signal is received.

When the owner wants to check if the luggage is within close range, the receiver is turned on. If the receiver detects a signal the owner is notified, e.g. by the receiver transmitting a second signal in the form of a ringing, beeping, flashing, vibration etc. The receiver may even transmit a radio signal or an infrared signal to another electronic device, the signal indicating that the luggage is within the predetermined interval. As will later be described the reverse function, namely that the second signal is transmitted as the luggage is moved out of the predetermined distance could also be implemented. This function will help people to remember objects and alert in case of theft. As an example the function will help travellers to remember their luggage or alert in case the luggage is stolen. Both functions could be activated, so that whenever an object is detected, the receiving unit will automatically alert, if the object is taken out of the pre-specified area.

The system could interact with existing legacy systems. These systems could be airline barcode baggage systems, RFID systems or airline tracking systems or other systems that could add valuable information to the technology like RFID or other short-range passive identification chips. By interacting with these existing systems and by allowing an owner of luggage with an identification unit if it is of one of the older passive types or if it is a unit according to the present invention to access the luggage handling system, it will be possible for the luggage owner to check an actual location of luggage during transit or flight. When a airline company realizes, that a piece of luggage has been sent to a wrong destination, they can send an SMS (Short Message Service) or an email to the luggage owner and thus arrange proper redirection of the luggage. The address of the owner could be stored within the tag or stored in a memory which is accessible via an Internet page at a Internet site addressed by the information stored in the tag.

As another example, a transmitting unit attached to a bike or similar object will alert the owner of the object if the object is stolen.

Preferably the first transmitting unit comprises an electronic data processing unit and may further have a storage unit for storing electronic data. The storage unit can be used for storing information related to the owner of the luggage. As an example the storage may be used for storing the name and address of the owner, a link to a home page of the owner, the blood type of the owner, the travel plan or schedule related to the luggage etc. The storage may also be used for storing information related to the luggage such as the weight of the luggage, the destination and origination of the luggage or safety instructions related to the handling of the luggage. As an example the information could be related to a toxic, explosive, flammable or in any other way harmful content of the luggage and by means of the information stored in the storage, the persons handling the luggage may obtain useful information on how to handle the luggage safely. The information could also relate to the people who have been handling the luggage. As an example all people who have been handling the luggage may leave an insignia identifying them towards the owner of the luggage. When the owner of the luggage, after a journey gets the luggage delivered in the baggage claim area, it can easily be checked who, where and how the luggage has been treated. For that purpose the first unit may even be provided with input from an alarm device or from sensing devices capable of registering the conditions that the luggage has been subjected to, e.g. temperature, humidity, bumps etc or how many times the luggage has been opened.

The tag or information stored in the tag could preferably be associated with a database, e.g. a database which is accessible from the Internet. In the database, the owner of a tag may register all kinds of information, e.g. travel plans. The information stored in the tag could then be limited to a link or an address of the database information so that all relevant information can be retrieved directly from the database. The use of the database enables the owner of a tag to store a large amount of date without the limitations of the storage capacity of a relatively small electronic circuit of the tag. The use of a database also opens a number of opportunities for sharing information. As an example the customer of a flight ticket can simply use the tag with a link to a homepage of a travel company wherein the detailed travel plan is stored or a person may simply refer to a home page wherein personal information is stored, e.g. information extracted from an electronic calendar such as outlook from Microsoft. As another example, the use of the Internet will enable very flexible ways of paying for services. The holder of the tag could be identified in connection with admittance control, e.g. when entering a train, a bus, a cinema, a ski-lift system, a discotheque or any other place with admittance control. Along with the identification, an address and/or an authorisation code of an Internet account may be forwarded to the controlling authority and money may then be transferred from the holders account.

The owner of a tag may also choose to download information to be stored directly in the tag. The information could as for example relate to a travel plan. As an example the owner may download travel plans and other information related to the travel directly from a device connected to the Internet. The information could be an electronic flight ticket—E-ticket—and by downloading the E-ticket to the tag, the owner verifies towards the airport authorities and/or the airline staff the details of the travel. The suitcase with the tag could thus have the same identity as the traveller towards the authorities. By downloading information directly to the memory of the tag, the information may be retrieved without a connection to the Internet.

Preferably the first unit is adapted to receive an activation signal. When the activation signal is received the electronic data processing unit is adapted to activate transmission of said first signal in response to recognition of the activation signal. As an example the first unit is adapted to operate in an inactivated mode and in an activated mode. The unit may then switch between the modes upon detection of an activation signal of a recognisable type. The signal could be provided by means of a signal switch operationally connected to the first unit or may be provided by means of a signal transmitted by a second transmitting unit such as transmitted by the receiving unit.

The activation signal could comprise an insignia representing an identity of the second transmitting unit. As an example the receiving unit could transmit the activation signal and the signal could include a code only known to the first transmitting unit and to the receiving unit. When the first transmitting unit recognises the signal and the code, it starts to transmit. The activation signal could also include a unique identifier of the transmitting unit and the first transmitting unit could be adapted only to start transmission upon the detection of such a unique identifier. In that way it is easy for the owner of the luggage to detect whom has been activating the first transmission unit.

The activation signal could also include an insignia representing the identity of the first transmitting unit. This could be an advantage e.g. if a large number of luggage pieces is located in one room and only one of the respective first transmitting units are to be activated. The activation signal could include an identification number for a specific first transmitting unit, and the first transmitting units could be adapted only to be activated upon the detection of an activation signal including their own identification number.

According to a preferred embodiment of the invention the system further comprises an initialization unit adapted to transmit an initialization signal to the first transmitting unit. The initialization signal could be stored in the memory means for storing electronic data. The initialization signal could comprise data related to the owner of the luggage, as earlier described, name, address, blood type, destination address etc. or related to the contents of the luggage, weight of the luggage etc. The initialization signal could also comprise date related to an encryption method for encryption of the communication between the receiving unit and the first transmitting unit. As an example, the first transmitting unit may receive a key for the encryption of the data to be transmitted. The first transmitting unit may also be provided with an encryption key from the beginning. In that case the key for the encryption could be printed on a removable label attached to the surface of the first transmitting unit. When the owner of the luggage wants to use the system for the first time, the key for the encryption is read from the label and entered into the receiving unit thus becoming capable of receiving data transmitted by the first transmitting unit. Thereafter the label is removed from the first transmitting unit allowing only those having the key to receive data from that unit. The initialization signal may also include a software program adapted for the communication between the first transmitting unit and the receiving unit, i.e., the receipt of the software program by the first unit may initialize the first unit. The initialization unit may be integrated in the receiving unit or the initialization unit may be a separate unit, e.g. owned by dealers of the system or owned by the service personnel checking the luggage in at the airport. As an example the first transmitting unit may upon check in of the luggage in an airport receive an identification code. The code could be encrypted by use of an encryption key so that only authorized personnel can decode the identification code and so that no one but authorized personnel can change the code. Upon the check in procedure other information may be downloaded to the first transmitting unit e.g. the flight schedule, the weight of the luggage etc.

The first and/or the second signal transmitted by respectively the first transmitting unit and the receiving unit and/or the initialisation unit could preferably be transmitted as a radio signal with a frequency range being in the order of 2, 4 GHz. A frequency of this range provides a good transmissibility and enables compatibility with tools following the so-called Bluetooth™ standard for communication. Other frequencies and protocols may also be used. As an example the tag could be adapted for the DECT standard of for the HOME-RF standard or for the IEEE 802.11 standard. As an example, the tag may be provided with a switch for switching between the different standards or the tag may even be adapted to automatically switch to a standard frequency and protocol, based on which signal the tag receives. If the tag receives a signal from a HOME-RF unit, the tag will switch into HOME-RF mode and return a signal etc.

Preferably the first unit is adapted to operate in a first mode and a second mode, the power consumption of the first unit when operating in the first mode being lower than the power consumption of the first unit when operating in the second mode. The first mode could be a mode wherein the first unit is listening for any communication following the same communication protocol as the first unit, e.g. communication following the Bluetooth™ communication protocol. The mode is an energy saving mode, enabling extended operation time with a relatively small battery driving the first unit. The second mode is a data processing and transmission mode, wherein the first unit is processing received communication data send by use of the same communication protocol as the first unit is adapted for. In case the date is recognised, e.g. in case the data comprises a correct unique identifier or in case the date is encrypted with a key known to the first unit, the first unit starts to transmit a signal. This is more power consuming than just listening for communication within a specific communication protocol, but the second mode is only activated shortly. The signal may be send within a time period shorter than one second. During the time period the first unit scans a pre-specified frequency band and selects one band wherein the signal preferably should be send, e.g. due to the fact that the frequency band is less influenced by radio noise or due to the fact that no other devices at that moment uses that frequency band. The first unit thereafter transmits the signal within the frequency band.

According to a preferred embodiment of the invention the predetermined interval is 0,01–10000 meters, such as 10–90 meters, such as 20–80 meters or such as 1–10 meters.

The user could enter the predetermined interval or it could be coded into the processing unit or stored in the storage unit by the maker of the system. Preferably the receiving unit comprises data input means for user input of the predetermined interval, e.g. in the form of a numeric keyboard or by means of a dial.

The first and/or the second signal could preferably include a message. As an example the message could be related to the events planned for the luggage, the content of the luggage or related to the owner of the luggage. The message could also be a link to an Internet address wherein further information related to the luggage may be retrieved. The message could be encrypted so as to control whom receives the message. As an example the first transmitting unit may transmit a message containing the name of the owner of the luggage. Before transmitting the message, the unit is encrypted by the use of an encryption and decryption key known only to the first transmitting unit and the receiving unit. The encryption key could be stored in the memory means. When the receiving unit receives the message, it is being decrypted and presented to the user.

The receiving unit could be adapted to generate a notification signal in response to the message. As an example the notification signal could be that the receiving unit, e.g. by means of a WAP (Wireless Application Protocol) protocol connecting the user to an Internet or WAP page included in the message. Another example is that the receiving unit transmits an e-mail, makes a phone call or in any similar way establishes a communication channel for transmission of the message, part of the message or for transmission of a predetermined signal based on the contents of the message. As an example an airport may be provided with a number of receiving units receiving messages from transmitting units attached to luggage passing nearby the receiving unit. Upon receiving messages from the transmitting units, the receiving units forward those messages to a control system capable of processing the messages, e.g. in order to detect identities of the owners, calculate statistics related to the luggage etc. Another example is that a receiving unit is adapted to detect eventual e-mail addresses in the messages received, and upon the detection to forward advertising messages to the addresses or to forward a notification relevant to the owner of the luggage.

The receiving unit may have a display adapted to represent data representative of the message, e.g. a screen where text strings and graphics may be presented. The receiving unit may have further notification signalling means for transmission of notification signals upon the receiving a predetermined message. The notification signal could be that the receiving unit starts shaking, flashing, beeping or ringing upon receiving a message indicating that luggage owned by a certain owner, luggage of a certain kind etc, is within the distance.

According to a preferred embodiment of the system the receiving unit is integrated in a cellular phone such as a WAP phone, or integrated in a similar hand held device for transmission and receiving signals and/or capable of displaying messages and/or capable of transmitting notification signals. Examples of such devices are palm pilots, portable PCs with wireless communication interfaces etc.

Preferably the signals are transmitted and received with a communication protocol corresponding to the protocol for Bluetooth™ wireless communication. Bluetooth™ wireless technology is a de facto standard, as well as a specification for small-form factor, low-cost, short-range radio links between mobile PCs, mobile phones and other portable devices. The signals may also be transmitted and received with a communication protocol corresponding to the DECT standard, HOME-RF, IEEE 802.11 or similar market leading communication protocols.

The first and the second signal may also be transmitted as an acoustic signal, e.g. in the range between 20 kHz and 50 kHz, such as 25 kHz. This frequency is so low that a person would not, be able to hear the signal. The acoustic signal could be used, e.g. in areas where the radio signal may interfere with other radio signals. An example of such an area is an airport, wherein the planes communicate with the control tower and navigates by means of radio signals, in hospitals wherein the radio signals may interfere with life important equipment or in areas with much radio noise.

The first and the second signal may also be transmitted as an optic signal, e.g. as an infrared signal.

Preferably the signals, no matter if they are radio signals, acoustic signal or optic signals are transmitted as digital and modulated signals.

The shift from the operation in the first mode to operation in the second mode may according to a preferred embodiment be based upon detection of an optical effect. As an example, the first transmitting unit may shift upon detection of light, as the luggage is taken out of the luggage compartment of an aeroplane The first unit may also be adapted to shift from the operation in the first mode to operation in the second mode upon detection of a mechanical effect. As an example the shift may occur upon detection of bumps as the luggage is handled, upon detection of sound or upon detection of movement of the luggage, e.g. by the use of a device capable of detecting changes in the orientation of the unit.

According to a preferred embodiment of the invention the receiving unit is comprised in a key ring or in the bow of a key. Likewise the first unit may be integrated in a suitcase, such as in the handle of the suitcase or correspondingly integrated in the luggage.

According to a further preferred embodiment of the invention the receiving unit is adapted to generate the second signal in case the distance between the first transmitting unit and the receiving unit changes from being inside the predetermined interval to being outside the predetermined interval. As an example the owner of the luggage may want to be alerted if the luggage is moved outside the distance entered into the receiving unit such as if the owner forgets the luggage in a shop, or in case the luggage is stolen.

The receiving unit may as an example be adapted to generate a third signal representing the distance between the first transmitting unit and the receiving unit. The third signal could be a tone amplified according to the distance between the first transmitting unit and the receiving unit. The third signal could also be a dial showing the distance either in relation to the pre-determined distance entered into the receiving unit or it could simply be a digital display indicating the distance, e.g. in a selectable measuring unit. Preferably the receiving unit is also adapted to generate a fourth signal representing a distance deviation between the first transmitting unit and the receiving unit indicating if the distance is increasing or if the distance is decreasing.

According to another aspect the present invention relates to a receiving unit for use as the receiving unit of the above-described system.

According to another aspect the present invention relates to a transmitting unit for use as the transmitting unit of the above-described system.

According to another aspect the present invention relates specifically for a system for detecting luggage.

According to yet another aspect the present invention relates to a method of detecting luggage, said method comprising the steps of:

attaching a transmitting unit to the luggage, the unit having an identity and being provided with a transmitter for transmitting a signal representing the identity of the unit, and using a receiving unit provided with a receiver for receiving the first signal, and analysing the signal so as to determine the identity.

According to another aspect the present invention relates to a computer system for handling luggage, said computer system having processing means, receiving means for receiving a signal, input means for user provided input, output means for transmitting a signal and storage means having stored therein a computer program said processing means being adapted, in response to commands from said computer program, to:

receive a signal from a transmitting unit, based on the received signal, to determine the identity of the transmitting unit, and to generate a signal in case the identity of the transmitting unit is identical to a reference identity.

The reference identity could be entered by the user, through the input means and the generated signal could be transmitted to the user via the output means, e.g. in the form of an acoustic signal.

According to another aspect the present invention relates to a computer program for an electronic processing system, the computer program being adapted to perform the above mentioned method.

DETAILED DESCRIPTION OF THE INVENTION

Figure 2:
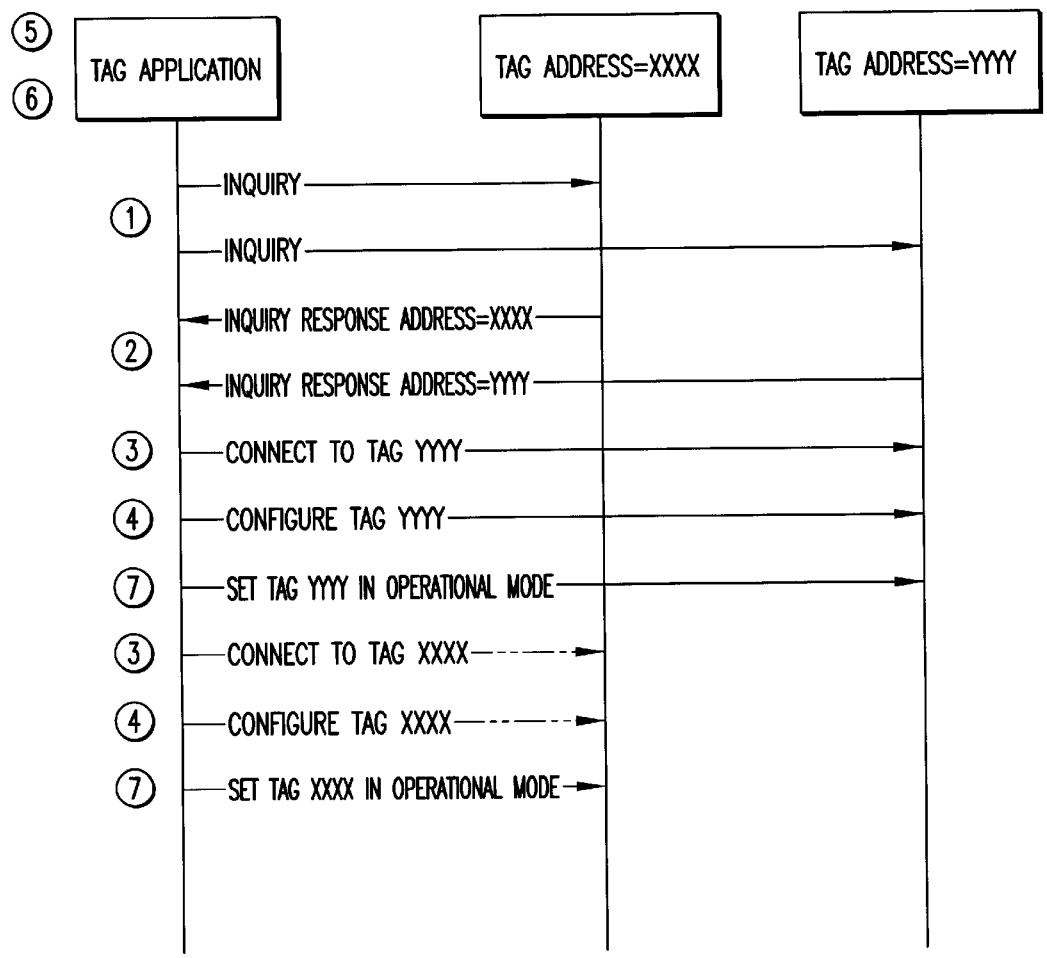
Figure 3:
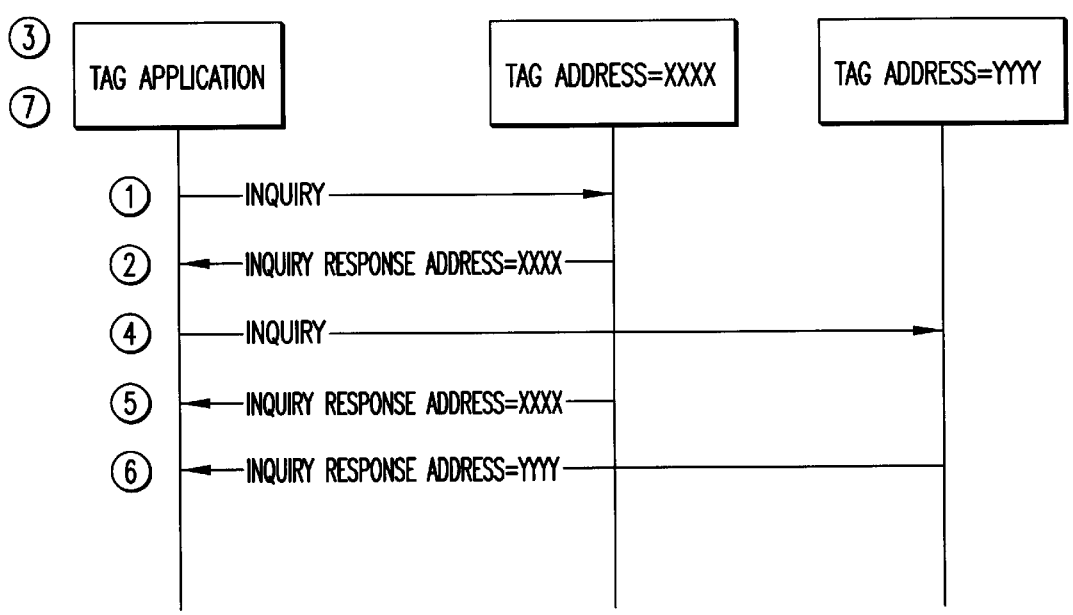
Figure 4:
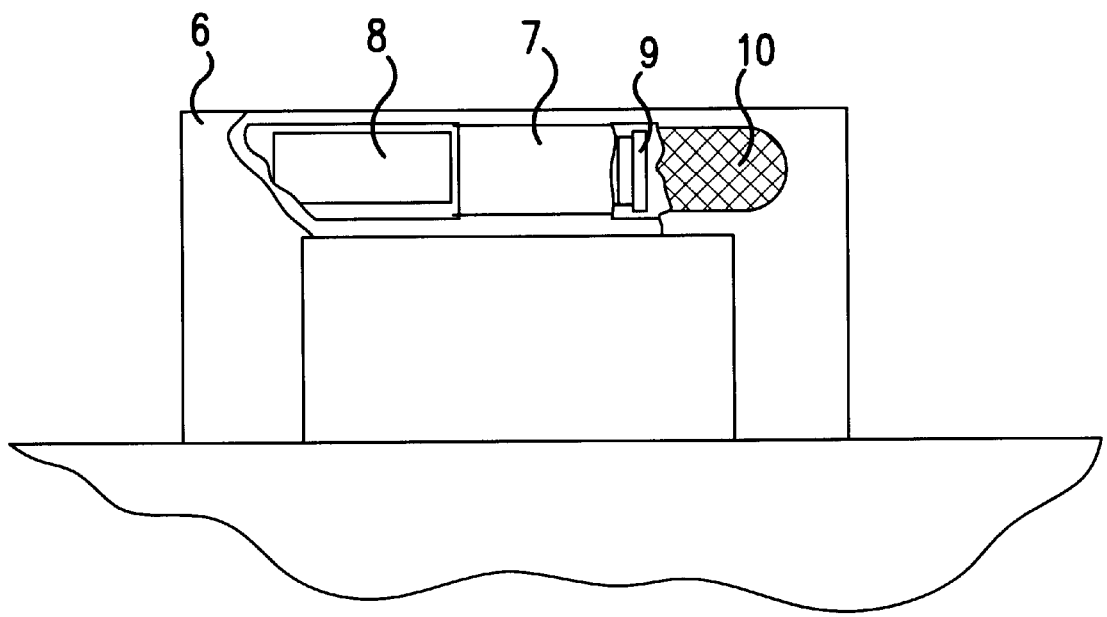
Figure 5:
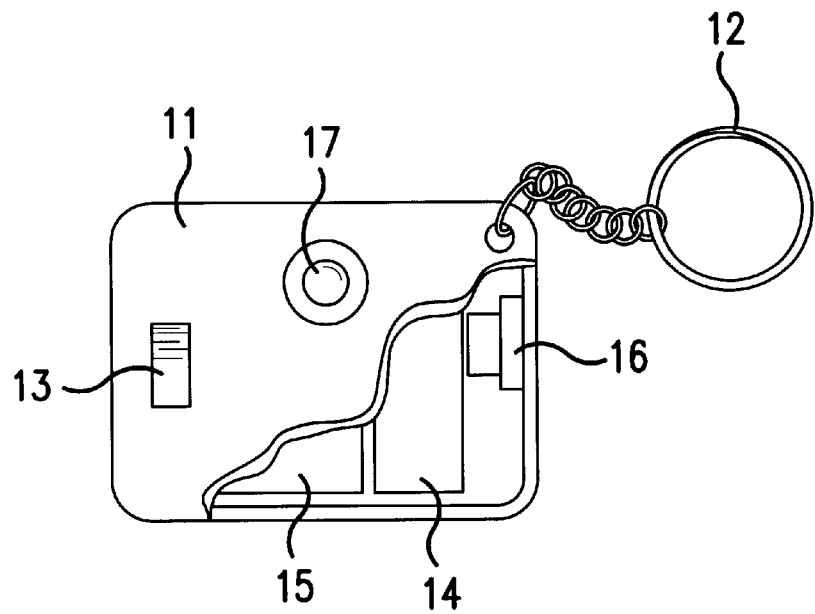
Figure 6:
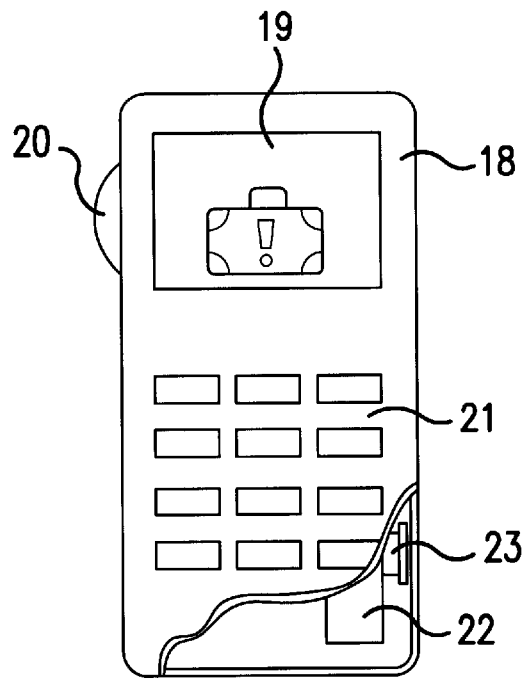
Figure 7:
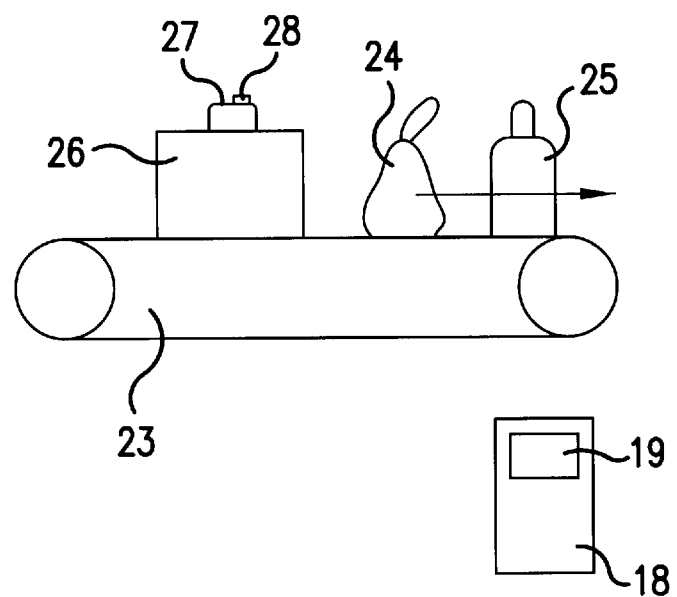
Figure 8:
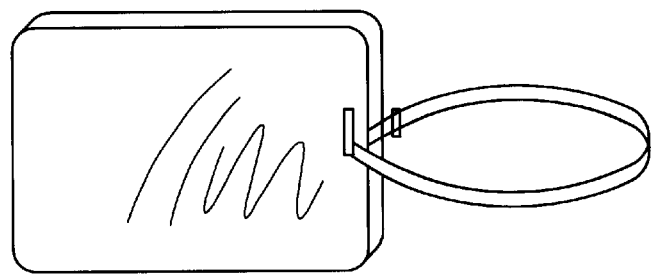
Figure 9:
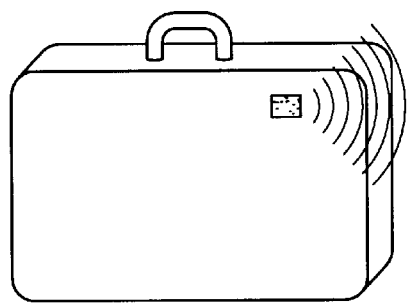
Figure 10:
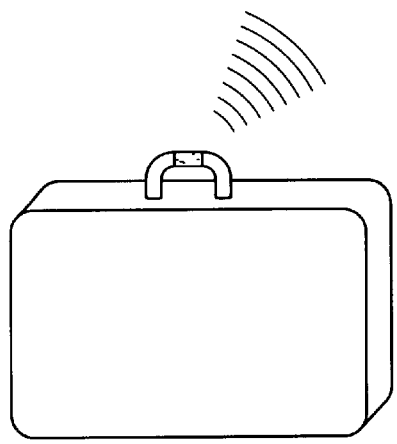
Figure 11:
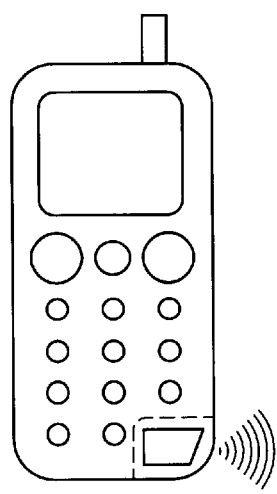
Figure 12:
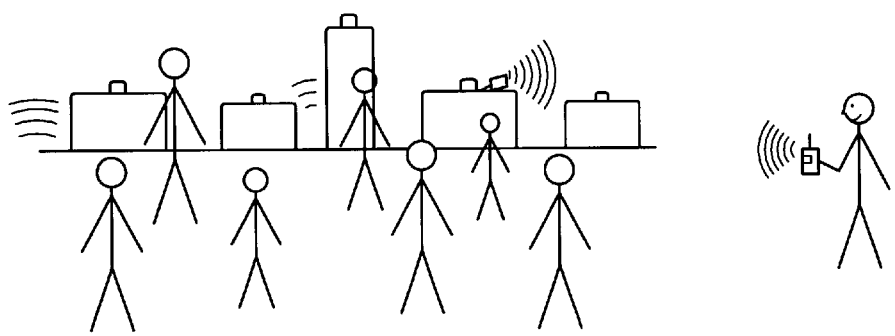
Figure 13:
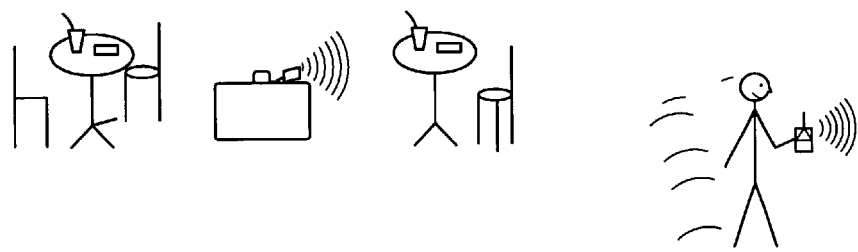
Figure 14:
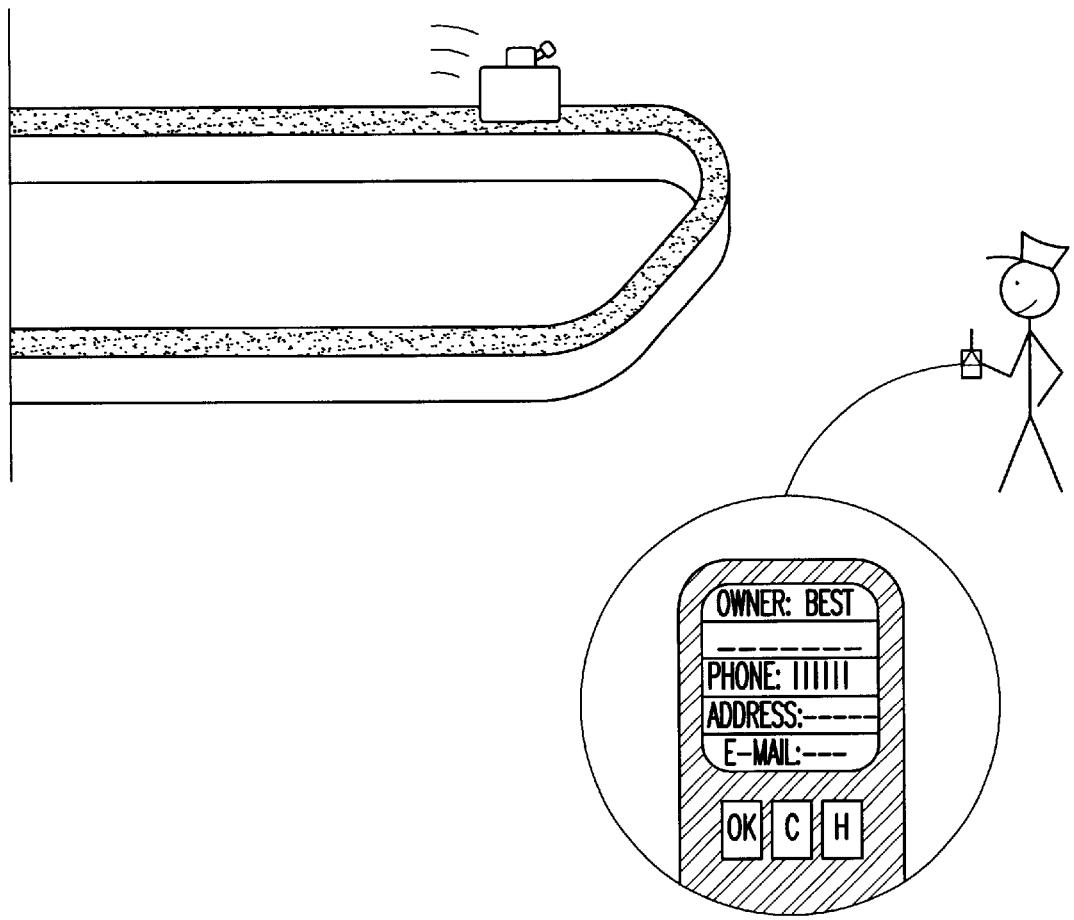

A preferred embodiment of the invention will now be described in details with reference to the drawing in which:

FIG. 1 is a block diagram showing a preferred embodiment of a transmitting and receiving unit according to the invention, FIG. 2 shows the "configure tag function" of the system application, FIG. 3 shows the "discover luggage tag in range" application, FIG. 4 shows an embodiment of a transmitting unit attached to the handle of a suitcase, FIG. 5 shows a receiving unit attached to a key ring, FIG. 6 shows an alternative embodiment of the invention, wherein the receiving unit is provided in a portable terminal, FIG. 7 shows an example of the use of a system according to the invention, adapted to localise a suitcase on a luggage transport system, e.g. in an airport terminal, FIG. 8, FIG. 9 and FIG. 10 show three different ways of attaching the tag to luggage, FIG. 11 shows the receiving unit integrated in a mobile phone device, and FIG. 12, FIG. 13 and FIG. 14 show three different situations wherein the system may be used.

The following example relates to a system according to the present invention and adapted for detecting and identifying luggage. The system comprises a transmitting unit to be attached to the luggage and a receiving unit. In the following example the transmitting unit will thus be referred to as the luggage tag and the receiving unit will be referred to as luggage detector. The luggage detecting system is a set of at least one luggage tag and a luggage detector, which in the following example is a combined unit with an initialisation unit.

Referring to FIG. 1 the luggage tag and the luggage detector comprises four main components, a power control circuit 1 a Bluetooth™ radio module 2, an interface for add-on components 3 and a processor 4. The four main components are interconnected by means of a system bus 5. The unit further comprises an EEPROM and/or RAM circuit for storing data and an antenna for the transmission and/or receiving of radio signals. Additionally the unit may be provided with an amplifier for amplification of the radio signal, or for the amplification of other signals, such as acoustic signals. The unit is comprised in a case capable of protecting the components from mechanical impact, e.g. due to rough handling of luggage.

The power control circuit 1 could be a battery and additional components for support of the unit in a time period such as for one year. The batteries could be selected from a combined requirement for supporting the unit with power and for keeping the size of the unit low. Regular AAA batteries may be preferred.

The interface for add-on components is adapted for optional parts such as for a display, for a push-button, for a speaker for the transmission of an acoustic signal or for a vibrator for the transmission of a vibration signal etc.

The processor 4 in combination with the EEPROM and/or RAM circuit will be the hardware platform for a software application. Through the antenna, the software application will be downloaded to the EEPROM. For this transmission the Bluetooth™ protocol will be used. In this way it will be possible to update the application as it is being developed. The processor, the RAM and/or the EEPROM are further responsible for the upper layers of the Bluetooth™ protocol.

The Application

The system application consist of 3 different types of functions which all work together in order to obtain the desired function namely to configure the luggage tag and to detect when a specific luggage tag is respectively moved into or out of a specified distance range between the luggage tag and the luggage detector. When referring to range this means the Bluetooth™ area covered by the system containing the system application or it means a range specified by the operator of the luggage detector or a range coded into the memory of the luggage tag.

The system application utilises the Bluetooth™ protocol in order to detect luggage tags in or out of range.

Initially when luggage tags are shipped they do not contain any user data and they are in an active discovery state, which means that they can be detected by an Inquiry from the system application.

Configuration of the Luggage Tags

At first when a new luggage tag is to be used the configure tag function of the system application is used. The "configure tag function" of the system application is shown in FIG. 2 and works as follows:

1. The system application sends an Inquiry command to any Bluetooth™ device within the specified range. This Inquiry command is repeated several times and acts as a broadcast command meaning that any Bluetooth™ device in range and which is in an active discovery state will respond.

2. The Bluetooth™ device named xxxx and the Bluetooth™ device named yyyy respond with their Bluetooth™ address.

3. The system application operator (the one operating the luggage detector) selects the device that he/she wishes to configure and connects to the device.

4. The operator enters all the details such as name, address, zip-code etc. and optionally sets a unique pin code which will be used for authentication and/or for encryption of the transmitted data.

5. The system application stores the address of the luggage tag, e.g. in the device named xxxx and the associated data and pin code.

6. Optionally the system application will send the address of the luggage tag and the associated user data (but not the pin code) to an Internet Server which keeps all the information in a common database (all registered luggage tags).

7. The system application sets the luggage tag in normal operational mode, which is active discovery state.

The user is free to reconfigure the luggage tag (the device named xxxx) or the user is free to go on to the configuration of any additional luggage tags. If a pin code was specified in the configuration of a device this same pin code is required in order to reconfigure that device. Only a reset (loss of power) can reset the Tag to initial state. This may require either that the battery is removed from the device or that a reset button is pressed.

Discover a Luggage Tag Positioned Within Range of the Luggage Detector

In order to discover luggage tags coming into the range of a system application the luggage tag(s) will have to be in an active discovery state. The active discovery state is the normal operation of the luggage tag(s).

In FIG. 3 shows the "discover luggage tag in range" application and it works as follows:

1. The operator of the luggage detector activates the "discover luggage tag(s) in range" function which will start sending an inquiry in order to obtain Bluetooth™ device addresses within the specified range.

2. Any Bluetooth™ device within the range and in active discovery state will respond to the inquiry command with it's Bluetooth™ address. In this case the luggage tag named xxxx is in range and will respond.

3. The system application will check to see if any of the addresses received are configured in the application. If there is a match between the Bluetooth™ address and one of the configured addresses, then the system application alerts the operator by displaying the name of the luggage tag and optionally transmits an acoustic alarm. The operator can then either exit the system application or alternatively set the system application in reverse mode. The reverse mode is adapted for detection of a luggage tag being within the range and going out of range.

4. The system application continues periodically sending out an inquiry in order to either discover whether the luggage tag named xxxx is going out of range or whether any other configured luggage tags are coming into range.

5. The luggage tag named xxxx responds to the inquiry with its address and confirms that the luggage tag is still in range. Eventually when the luggage tag named xxxx gets out of range the operator is alerted with a message or optionally with the acoustic alarm.

6. A luggage tag named yyyy gets into range and responds to the inquiry of the luggage detector. The system application will look up the Bluetooth™ address in order to see whether this address is configured as one of the operators configured Tags. The operator is alerted and can once again choose which action to take. The operator either exit the application or the operator sets the application in reverse mode in order to discover if the luggage tag named yyyy is going out of range.

7. The operator disables the system application. The luggage tags are still in operational mode.

The Bluetooth™ radio module can be purchased e.g. from cambridge silicon radio. A description of BlueCore™ 01 Single Chip Bluetooth™ System can be found on the Internet address www.CambridgeSiliconRadio.com. The Bluetooth™ protocol architecture can be found on the Internet address www.bluetooth.com.

FIG. 4 shows an embodiment of the luggage tag where the luggage tag is integrated in the handle 6 of a suitcase. The handle has a build-in Bluetooth™ circuit 7 connected to a power source 8 and an antenna 9. In order to improve the transmission from the antenna 9 the handle may be provided with a perforated area 10. The perforation also enables the Bluetooth™ circuit to be activated by means of light, e.g. when the suitcase is removed from an aeroplane.

FIG. 5 shows an embodiment of the luggage detector attached to a key ring 12. The luggage detector 11 has a switch 13 for switching the detector on and off. The luggage detector has a Bluetooth™ circuit 14 for transmitting and receiving signals between other Bluetooth™ circuits (luggage tags). The Bluetooth™ circuit is connected to a power source 15 and to an antenna 16. The speaker 17 is connected to the circuit and adapted for transmission of an acoustic signal upon detection of a luggage tag. The luggage detector may further be provided with a flash or a vibrator for the signalling.

FIG. 6 shows an alternative embodiment of the luggage detector wherein the luggage detector is integrated in a hand held terminal 18 with a screen 19. The screen is adapted for display of messages received from other Bluetooth™ circuits and for displaying graphics, e.g. pictures included in the message received from a luggage tag. The picture could, as seen in FIG. 6 be a picture of the suitcase of the luggage tag, so that the operator of the luggage detector knows what to look for. The terminal has a switch button 20 for switching on and off and for regulating the volume of the acoustic signal. The keyboard 21 is provided for entering data to be transmitted to a luggage tag, and or for adjusting the distance range. The data to be transmitted to a luggage tag could be alphanumeric text strings, integers etc. As an example the operator may create a text string with a name and address. The text may be seen on the screen and may be edited by means of the keyboard and then transmitted to the luggage tag. The Bluetooth™ circuit 22 and the antenna 23 is adapted for transmission of Bluetooth™ signals.

FIG. 7 shows a luggage conveyer 23 and three pieces of luggage 24,25 and 26. The suitcase 26 is provided with a handle 27 with an integrated luggage tag 28. The terminal 18 is similar to the terminal of FIG. 6. As the suitcase 26 is advanced on the conveyer the luggage tag is activated e.g. by the movement of the conveyer or by the illumination of the room or the luggage tag is activated by presence of Bluetooth™ signals in the area.

FIG. 8, FIG. 9 and FIG. 10 shows three different embodiments of the luggage tag. FIG. 8 shows a luggage tag similar to well known luggage tags for hand written labels but for electronic transmission of Bluetooth™ signals. The luggage tag can be attached to the luggage by means of the strap.

FIG. 9 shows a suitcase wherein the luggage tag is integrated in the case. This is a preferred embodiment of the luggage tag since it is very difficult to remove the luggage tag or to switch luggage tags between suitcases. The airport staff may e.g. at the check in procedure download a unique and encrypted identification and destination code in the luggage tag. The luggage tag is integrated into the case in a security proved way and can only be removed from the luggage by visible destruction of the case. The tag may therefor throughout the journey be used for identification and routing of the suitcase.

FIG. 10 shows a suitcase with the luggage tag integrated in the handle of the suitcase.

FIG. 11 shows a cellular phone such as a WAP phone with an integrated luggage detector. The luggage detector may utilise the existing facilities of the phone, such as the power supply, the screen, the keyboard, the speaker and/or a vibrator. In certain cases the luggage detector may even use the existing transmitting frequencies and/or the antenna of the cellular phone. The luggage detector could as an example be adapted to use the cellular phone for establishing either a phone call or an Internet connection (WAP connection) based on the detection of a certain luggage tag or based on a message included in a detected luggage tag.

FIG. 12 shows a situation where a person is waiting for luggage in the baggage claim area of an airport. By means of a luggage detector the person is alerted that the luggage is within a distance of 10 meters, since the person has adjusted the luggage detector for a distance range of 0–10 meters. By means of the luggage detector the person can be informed about data and conditions related to the luggage. As an example the person can get a picture of the luggage or be informed if other persons have communicated with the luggage tag, e.g. if the airport staff has either downloaded or uploaded information from the luggage tag.

In FIG. 13 the person has forgotten the luggage in a restaurant and is now being alerted by the luggage detector. The alert is activated as the distance between the luggage detector and the luggage tag exceeds 10 meters.

FIG. 14 shows a situation wherein security staff in an airport inspects a suitcase left on the luggage conveyer. By means of a "Main Luggage Detector" the staff may request information from any luggage tag. In the shown example the "Main Luggage Detector" has received the name, phone number, address and e-mail address of the owner of the luggage. The information could also have been related to the flight schedule of the owner or to the content of the luggage.

In the following a number of examples of applications for the system will be described by means of examples.

The Basic function of the invention is directed towards a tag attached to a suitcase or similar luggage. The tag is used for the notification of a luggage owner when luggage enters or leaves a specified area such as a 10 meters radius. In airports the owner avoids having to wait in a line in front of the luggage conveyer. Instead the owner is notified when the luggage arrives on the conveyer. The owner can also make sure that the luggage picked up at the conveyor is the right luggage since only one luggage tag or at least only selected luggage tags are capable of communicating with the receiver of the owner.

When the luggage has been picked up, the receiver and/or the tag may be switched into a reverse mode wherein the owner of the luggage is notified if the luggage (or at least the tag) is moved outside the specified area. The tag and the receiver thus works as an alarm either towards theft or towards that the owner forgets the luggage.

The tag may of course not only be attached to luggage but be attached to any kind of articles. In the following examples a more general use of the tag for various purpose will be given.

Except from the advantage of tag system for alerting, the system will enable the return of articles with a tag to the owner due to information stored in the tag. As an example the system will enable that authorities such as police officers or security staff in the airport may read the information stored in a tag of a suitcase left over and the information may lead to the owner.

When a tag is used for the first time, the user may enter a web site where a list of applicable receivers may be selected as the receiving unit of the system. As an example the user may select between Palm pilots, mobile phones, PC's, Camcorders or similar devices capable of communicating according to the Bluetooth™ standard. When the receiver has been selected the user may download a software application corresponding to the selected device and/or corresponding to the selected use of the tag. If the receiver is capable of receiving digital information directly from the Internet, the software will be downloaded directly to the receiver. In other cases the software will be downloaded e.g. to a PC and from the PC downloaded to the receiver by means of Bluetooth™ communication or by means of any other data carrier such as a computer disc, a tape or similar.

When the software has been downloaded the Internet connection may be interrupted. In order to initialise the receiver and/or the tag, the user registers a name, an address or similar insignia representing the identity or address of the user. If the receiver is a mobile phone the information may be entered by means of the numeric keyboard, if the receiver is a palm pilot or a PC the information may of course be entered directly by means of the keyboard. The tag is also given a unique insignia in form of a text string such as a name—"my suitcase no. 1" a number or similar insignia. The insignia is downloaded from the receiver to the tag by use of Bluetooth™ communication.

When the user wants to use the system, the receiver is activated. If the user owns more than one tag, the user selects the tag or the tags that is going to be detected by the receiver and activates the detection mode. In case one or more of the tags enters a pre-specified range, the receiver transmits an attention signal and/or indicates on a display which tag is within the range. The user may now switch to reverse mode or the receiver may automatically switch to reverse mode. When that tag is moved outside the specified range the receiver once again transmits an attention signal. Even though the receiver is switched into reverse mode for one specific detected tag the receiver may be in regular mode for the other specified tags so that an attention signal is transmitted either if detected tags are moved outside the specified range or if undetected tags are being detected within the pre-specified range.

The communication between the receiver and the tags is protected so that only selected receivers may communicate with the tags. The receivers may be grouped so that one group of receivers is capable of communicating or at least capable of receiving information from any tag—a class 1 scanner, see description on the next pages. Those receivers could be sold exclusively to authorities. Another group of receivers may be capable of transmitting to any tag without being able to receive information from any tags. Those receivers could be sold to people who want to indicate that they have been handling e.g. luggage connected to the tag. Another group of receivers may be capable of transmitting information to all tags and capable of receiving information from selected tags. This would be the typical capability of a receiver owned by a regular user of the system.

As an example the tag system may be used for detecting the presence of a child. The tag could be provided integrated in a wristband, a waistband, in braces or reins or in barrettes. The system could be provided for notifying when the kids leave a pre-specified range from the receiver. As an example parents could use the system for surveillance of the kids while being on the beach, in a supermarket or just at home in the garden. The tag could be programmed with the name and address of the child, blood type and/or certain allergies such as allergy towards penicillin or anaesthesia so that a lost or even injured child may quickly be treated and brought back.

As another example the tag system may be used for professionals such as by contractors, craftsmen, plumbers etc. The tag could as an example be integrated in expensive tools so that theft can be detected. The tag may for example be programmed with a tool number and a description of the type of tool.

As another example the tag system may be used in connection with sports equipment. The tag may be integrated in skies, snowboards, golf bags, bicycles, canoes etc. and by means of the receiver the owner of the equipment can be notified if anyone steals the equipment. The receiver may also be used to ensure that the equipment is not mixed up with other people's equipment, which easily could be the case, e.g. outside a ski sports restaurant or outside the golf club.

As another example the tag system may be used for the surveillance of senior citizens, e.g. for surveillance of persons suffering from senile dementia. Again the tag could be programmed with information related to the persons health, address, contact persons etc.

As another example the tag system may be used for safety purposes. The tag could be integrated in safety vests or in off shore gear for persons working on ships, fishing boats, drilling platforms, shipyards or in similar environments. The tag could further be provided with visual signals such as a light that starts flashing when the tag gets outside the pre-determined area. The system could furthermore be integrated in other safety and/or navigational equipment such as integrated with a GPS system. In that case the GPS system could log the position at the moment the tag gets outside the pre-determined area. The tag could further be provided with GPS equipment so that the tag itself could transmit a signal including the position of the tag.

As another example the tag system could be used for identification and/or location of goods send via a mail system or via a shipping system. The tag could as an example be attached to a container for transportation of goods. The tag could be programmed with information relating to the good, such as relating to safety instructions for safe transportation of the goods or instructions for customs declaration of the goods. The tag could also be connected to equipment for surveillance of the conditions of the container such as the humidity or the temperature of the container. If e.g. the temperature gets outside a pre-determined area, the tag could send an attention signal to the receiver so that the necessary pre-caution may be taken. The connected equipment could also store information related e.g. to the temperature in the tag, so that the conditions that the goods was subjected to, later can be monitored. The tag could also be used for checking the gods in and out between different transportation units. As an example the gods may be scanned by means of the tag system as it is loaded onto a truck and again when it is reloaded onto a ship and so on. In this way the system can support tracking the events of the goods and the position of the goods. The information programmed into the tag could be coded so that only the owner of the goods and authorities such as the customs or police may decode the information or eventually the shipping company may decode at least part of the information. As an example the information may be stored with different coding principles, e.g. so that the shipping company can read the shipping safety instructions, but not the actual content of the container. The customs on the other hand can decode the customs declaration but may not be able to se all details of the safety instruction, whereas the police may be able to decode al available information.

As another example the tag system may be used in connection with clothes. The tag could be integrated in cloth with the purpose of identifying the person wearing the cloth or with the purpose of theft protecting the cloth. The tag could be programmed with a code that identifies the person towards the authorities or that verifies the identity of the person in relation to admittance control etc.

At a hospital the tag may be used as an electronic identification of the patients and the information stored in the tag could relate to the actual medical record for a patient.

The tag could in general be used for connecting people or for alerting people of the presence of other people with certain characteristic properties which could be stored in the memory. As an example the tags could be used in bars, cafes or discotheques or even over the Internet via Internet-enabled mobile phones and PDAs for match-making. The people being present e.g. in a bar could all have a tag by means of which they can exhibit personal characteristics such as age, gender, interests etc. or they could even expose poems, a piece of music, a picture or the like. Each tag could be provided with a personal identification code and a password and indication of main interests such as to find a friend, sport or the like. The information could be stored in the memory of the tag or in an Internet database, in which case the tag should carry an address of the information in the Internet database. As an example, scanners could be installed at the entrance to bars, cafés, pubs and discotheques or at similar places. When a person enters the bar, his or her tag will be scanned and the information will be uploaded to the Internet. Visitors of the home-page, e.g. people whom have been provided with a login name and a password, can now see the profiles of the persons in a particular bar or café or discotheque. Based on the knowledge about the persons in various places the visitor may decide which places to visit.

If a person wants to make contact with a person having a particular interesting profile, an e-mail or an SMS-message (Small Message Service for mobile phones) may be transmitted to that person. Due to the unique identification code of the tags, this may be possible even without knowing the name of the person having the profile. The system could be provided with a table containing the relations between the unique identification codes and either an e-mail address, a phone number an SMS identification code or similar identification means that may be used for making contact with the person carrying the tag. It will thus be possible for people to move anonymously around between bars, by not wearing a tag, by switching the tag off or simply by providing a relation between the tag and an anonymous address where to be reached.

As another example the tag could be used in connection with delivery of mail. The tag could be positioned on or nearby a letterbox. The owner of the letterbox (or the owner of the tag) visits a home page dedicated for the delivery of mail. At the home page, the owner fills out a form, indicating which kind of mail the owner wants to receive. Certain mail groups may thus be cancelled, e.g. in the case the owner does not want advertising folders or in the case the owner only wants advertising folders of a certain kind. The advertising folders could be divided into groups of interest e.g. in relation to food, hobby, leisure etc. In the form, the owner also indicates a unique insignia of the tag and optionally the name and address of the mail receiver of the letterbox. The owner could also indicate holidays or similar periods wherein the owner doesn't want any mail at all. In the future customers may sign a very flexible advertising on newspapers, e.g. paying for one paper a day. Everyday, e.g. before noon, the customer selects from a list on the home page, which paper to receive on the succeeding day. The publishers may use the home page to find out how many papers of each type to print and the paper man may use the tag connected to the letterbox together with a connection to the home page to find out which paper to deliver. The home page could also be used to check an account with the publisher or newspaper.

As earlier mentioned the receivers could preferably be grouped into class 1 receivers and class 2 receivers. Class 1 receivers could be provided to airport staff, railways station staff, lost property offices etc. The receiver is primarily adapted to receive and decode information with the purpose of receiving address information from the tags. Class 2 receivers could be provided to authorities, police, security staff, hospital staff etc, and be capable of receiving and decoding more sensitive or personal information from the tags. Finally of course a system user should be provided with a receiver capable of receiving all available information from those tags belonging to that user plus being capable of downloading information to those tags.

What is claimed is:

1. An object detection system comprising:
at least one first transmitting unit to be located near the object, the first unit having an identity and being provided with a transmitter for transmitting a first signal representing the identity of the first transmitting unit, and
a receiving unit provided with a receiver for receiving the first signal, the receiving unit being adapted to generate a second signal in case the first signal represents the identity of one of said at least one first transmitting unit,
the receiving unit being adapted to receive the first signal when the distance between the first transmitting unit and the receiving unit is within a predetermined interval, the first transmitting unit being adapted to operate in a first mode and a second mode, the power consumption of the first transmitting unit when operating in the first mode being lower than the power consumption of the first transmitting unit when operating in the second mode, and the first transmitting unit being adapted to shift from the operation in the first mode to operation in the second mode upon detection of acceleration.

2. A system according to claim 1, wherein the first transmitting unit comprises an active transmitting unit, provided with power driven means for transmitting the first signal in the form of a radio signal and wherein the first transmitting unit comprises a power source.

3. A system according to claim 1, wherein the second signal comprises a signal selected from the group consisting of an acoustic signal, a motional signal, a radio signal, and an infrared signal.

4. A system according to claim 1, wherein the first unit comprises an electronic data processing unit, and wherein the first unit is adapted to receive an activation signal, the electronic data processing unit being adapted to activate transmission of said first signal in response to a recognition of the activation signal.

5. A system according to claim 4, wherein the activation signal is transmitted by a second transmitting unit.

6. A system according to claim 4, wherein the activation signal is generated by a switch operationally connected to the first unit.

7. A system according to claim 5, wherein the activation signal comprises an insignia representing an identity of the second transmitting unit.

8. A system according to claim 4, wherein the activation signal comprises an insignia representing an identity of the first transmitting unit.

9. A system according to claim 1, further comprising an initialization unit adapted to transmit an initialization signal to the first transmitting unit, the first transmitting unit comprising memory means for storing data representative of the initialization signal.

10. A system according to claim 1, wherein at least one of either the first signal, the second signal, and the activation signal, is transmitted as a radio signal with a frequency enabling compatibility with tools following the BLUE-TOOTHTM standard for communication.

11. A system according to claim 1, wherein the first unit is adapted to operate in a first mode and a second mode, the power consumption of the first unit when operating in the first mode being lower than the power consumption of the first unit when operating in the second mode.

12. A system according to claim 10, wherein the first unit is adapted to shift from the operation in the first mode to operation in the second mode upon detection of a radio signal within the frequency enabling compatibility with tools following the BLUETOOTHTM standard for communication.

13. A system according to claim 11, wherein the first and/or the second unit is adapted to select a radio frequency band within said frequency range for the transmission of the first and second signal, the frequency band being selected from a number of predefined frequency bands.

14. A system according to claim 1, wherein the receiving unit comprises data input means for user input of the predetermined interval.

15. A system according to claim 1, wherein the first and/or second signal contains a message.

16. A system according to claim 15, wherein the message is encrypted by the first transmitting unit, and wherein the receiving unit is adapted to decrypt the message.

17. A system according to claim 16, wherein the message is encrypted by means of an encryption key stored in the memory means.

18. A system according to claim 15, wherein the receiving unit is adapted to generate a notification signal in response to the message.

19. A system according to claim 15, wherein the receiving unit comprises a display adapted to represent data representative of the message.

20. A system according to claim 9, wherein the initialization unit is integrated in the receiving unit.

21. A system according to claim 1, wherein the receiving unit is integrated in a cellular phone.

22. A system according to claim 1, wherein the receiving unit is integrated in a palm pilot.

23. A system according to claim 1, wherein the signal is transmitted with a communication protocol, and wherein the protocol corresponds to the protocol for Bluetooth™ communication.

24. A system according to claim 1, wherein the first and the second signal are transmitted as an acoustic signal.

25. A system according to claim 1, wherein the first and the second signal are transmitted as an optic signal.

26. A system according to claim 25, wherein the optic signal is an infrared signal.

27. A system according to claim 1, wherein the first and the second signal are transmitted as digital and modulated signals.

28. A system according to claim 1, wherein the receiving unit is comprised in a key ring.

29. A system according to claim 1, wherein the receiving unit is adapted to generate the second signal in case the distance between the first transmitting unit and the receiving unit changes from being inside the predetermined interval to being outside the predetermined interval.

30. A system according to claim 1, wherein the receiving unit is adapted to generate a third signal representing the distance between the first transmitting unit and the receiving unit.

31. A system according to claim 1, wherein the receiving unit is adapted to generate a fourth signal representing a distance deviation between the first transmitting unit and the receiving unit.

32. A receiving unit for use as the transmitting unit of the system according to claim 1.

33. A transmitting unit for use as the transmitting unit of the system according to claim 1.

* * * * *